Figure 1:
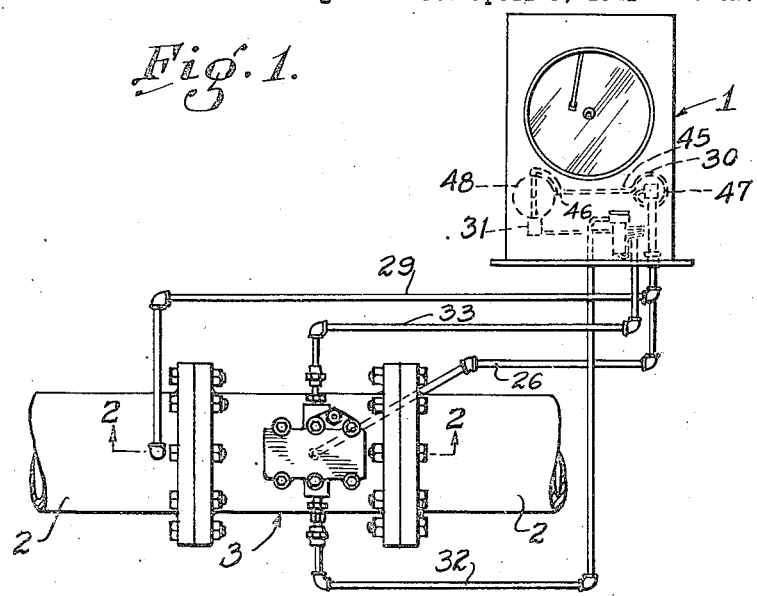

March 25, 1947.    G. S. BINCKLEY    2,417,966
INTEGRATING LINKAGE
Original Filed April 1, 1941    3 Sheets-Sheet 1

INVENTOR.
GEORGE S. BINCKLEY,
Deceased,
Sydney William Binckley, Executor,
By Calvin Brown,
ATTORNEY.

March 25, 1947.    G. S. BINCKLEY    2,417,966
INTEGRATING LINKAGE
Original Filed April 1, 1941    3 Sheets-Sheet 2

INVENTOR.
GEORGE S. BINCKLEY, Deceased,
Sydney William Binckley, Executor,
By Calvin Brown,
ATTORNEY.

March 25, 1947. G. S. BINCKLEY 2,417,966
INTEGRATING LINKAGE
Original Filed April 1, 1941 3 Sheets-Sheet 3

INVENTOR.
GEORGE S. BINCKLEY,
Deceased
Sydney William Binckley, Executor,
By Colvin Brown,
ATTORNEY.

Patented Mar. 25, 1947

2,417,966

UNITED STATES PATENT OFFICE 2,417,966

INTEGRATING LINKAGE

George S. Binckley, deceased, late of Los Angeles, Calif., by Sydney William Binckley, executor, Los Angeles, Calif.

Original application April 1, 1941, Serial No. 386,229. Divided and this application November 18, 1944, Serial No. 564,134

7 Claims. (Cl. 74—1)

This invention relates to integrating linkage and forms a divisional of the copending application of George S. Binckley, deceased, filed April 1, 1941, Serial No. 386,229, for Fluid meters.

Specifically, the present invention has for an object the provision of linkage adapted to integrate for meter purposes two variables. It is ordinary practice to record on a chart two separate lines indicating differential pressure and static pressure, or density and some factor, and then, by calculation, to integrate the separate line records traced by two pens over which the rate of flow of a liquid may be determined. Such a calculating machine is costly, and requires a skilled technician, while the present invention provides an integrating mechanism which produces a single line record of the integrated value of the differential pressure and the static pressure, or the density of the liquid.

Another object of the invention is the provision of a device whereby various corrections which are essential to secure accurate measurement of a liquid, are automatically applied, and their values automatically integrated, thus eliminating calculations which would otherwise have to be applied.

Other objects include a device which is simple of construction and inexpensive in cost of manufacture.

Figure 2:
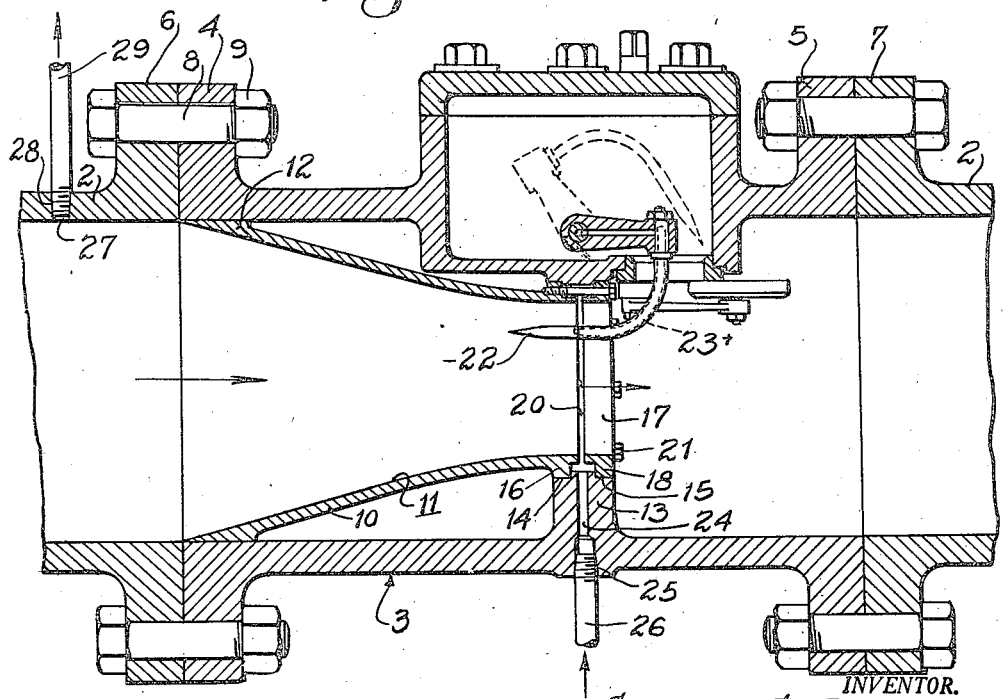
Figure 3:
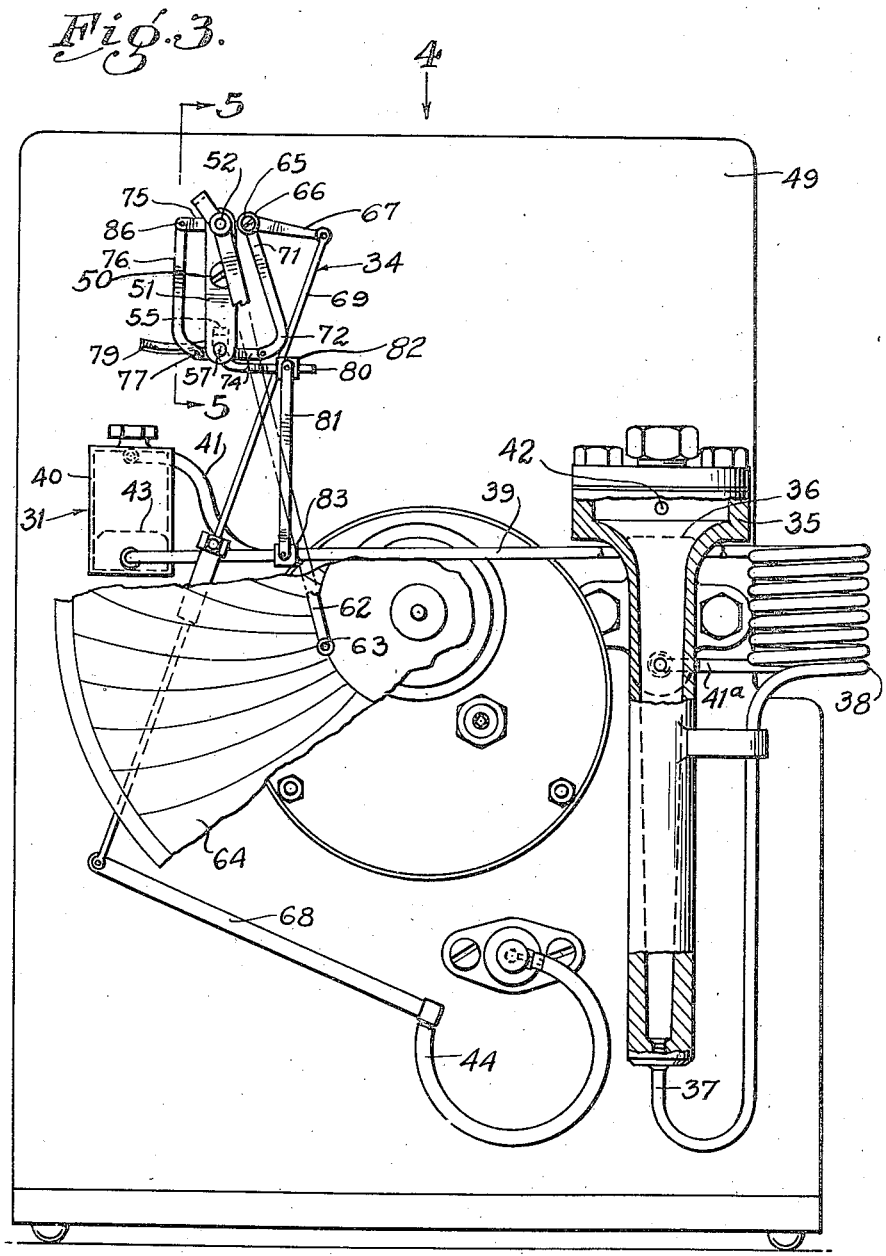
Figure 4:
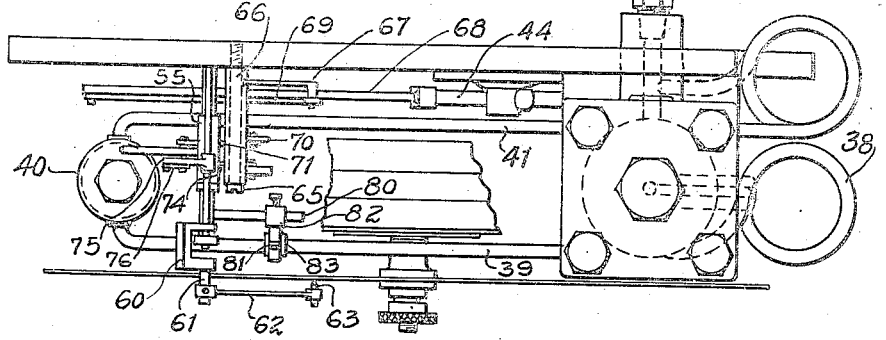
Figure 5:
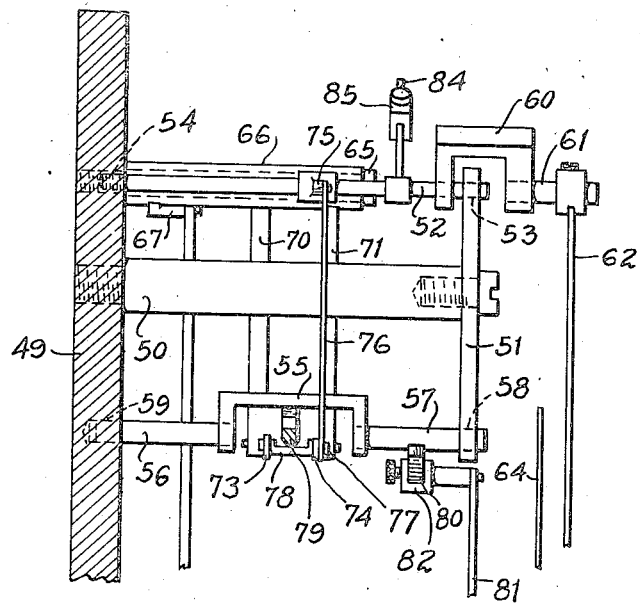

In the drawings:

Figure 1 is an elevational view of one form of fluid meter shown in cooperation with a pipe line through which a fluid or gas is passed, the weight rate of flow of which is to be indicated by the meter, Figure 2 is a sectional view on the line 2—2 of Figure 1, Figure 3 is a fragmentary sectional detail of the meter incorporating the integrating linkage and showing means for recording the rate weight of flow of gases, Figure 4 is a plan view of means shown in Figure 3 and looking in the direction of the arrow 4 in said figure, and Figure 5 is an enlarged, partly sectional, detail on the line 5—5 of Figure 3.

Referring now with particularity to the drawings, in Figure 1, at 1, is shown a meter which incorporates the invention. This meter is adapted for use with liquids, whereas that form of the meter shown in Figure 3 is adapted for use with gases. 2 is a pipe line through which either a gas or a liquid is passed, and which is cut to receive means 3, this means being detailed in Figure 2. This means constitutes an orifice or contracted throat through which the fluid to be measured must pass, together with devices placed within the orifice or contracted throat and so functioning that when fluid is moving through said orifice or throat, there will be a difference in pressure effect in said devices representative of the actual velocity of the flowing stream. The meter 1 is directly connected to the means 3 for indicating said differential pressure. Specifically, means 3 includes a casting provided with flanged ends 4 and 5 adapted to mate with like flanged ends 6 and 7 on pipes 2. These flanges may be secured together in any appropriate manner, such as by the use of bolts 8 passed through aligned openings in the flanges and secured by nuts 9. Within the casting is a contracted throat member 10. Surface 11 of member 10 is in the form of an elliptical curve and the approach cone is tangent to the curve. At the zone of greatest diameter is an annular external flange or foot 12 adapted to fit tightly within the confines of the casing. The opposite end portion, being the portion of minimum diameter, may be supported by an annular rib 13, formed in the casting. This annular rib is provided with a pair of annular shoulders 14 and 15, the contracted throat being provided with an external annular flange 16 adapted to rest on the annular shoulder 14. A ring 17 is provided with an annular flange 18, which flange rests upon shoulder 15. This ring is adapted to be slightly spaced from the end 19 of said throat member 10, the spacing being indicated by 20. The ring and the contracted throat member are held in working relationship by means of screw bolts 21, cooperatively engaging the annular flanges 16 and 18. This space, indicated at 20, is an annular slit, and for the purpose of the present description, the said ring may be considered as a part of the contracted throat member, although for convenience of construction, the device may be formed as shown in Figure 2. Within the contracted portion of member 10 are Pitot and static tubes, to-wit, a positive tube and a static tube, the static tube being shown at 22, while the positive tube parallels the static tube and is indicated by the dotted lines at 23. These tubes are of the usual construction, well known in the art, and as usual, the static tube is pointed, while the positive tube is open-ended.

The web 13 is provided with bore 24, which is threadedly counter-bored at 25, to receive the threaded end of pipe 26. Bore 24 is in direct communication with slit 20. When a fluid is passing through the contracted throat, the zone of negative or static pressure is in the plane of the slit 20. On the upstream or positive side of the pipe 2 is a transverse bore 27, which is threadedly counter-bored at 28 to receive the threaded end of pipe 29. Upon reference to Figure 1, it will be seen that pipes 26 and 29 communicate with means 30. This means permits a measurement of the density of liquid flow through pipe 2. Reference is made to Binckley Patents 2,377,605 and 2,321,175 for further details of this structure.

Differential pressure means is shown at 31 in Figure 1, and detailed in Figure 3. Pipes 32 and 33 directly communicate with the static and positive Pitot tubes, and lead to the means 31. The means 30 and 31 cooperate through integrating linkage, designated generally as 34 in Figure 3, to actuate a pen-arm over a chart and to give a single-line reading on said chart, which is representative of the weight of a liquid or fluid moving through the contracted throat 10. The differential pressure means includes a reservoir 35 adapted to hold some liquid, such as mercury 36. The bottom of the reservoir is in communication with the tube 37, which is coiled at 38, and then provided with an extended arm portion 39 leading to an operating chamber 40, specifically adjacent the bottom of said chamber. A second tube 41 is in communication with the operating chamber adjacent the top thereof and is curvedly bent to provide an arm portion which parallels arm portion 39, and finally coiled into a form identical with coil 38, terminating, as shown at 41ª, where said tube communicates with pipe 33. Pipe 32 communicates with the reservoir 35 above the surface of the mercury therein at zone 42. This reservoir is capped, as shown. The straight portions of the tubes 39 and 41 provide elastic arms supporting the operating chamber 40 and it is the intent that mercury should not only fill the reservoir, as indicated, but should be confined in the tube 37 with the mercury received within the operating chamber at the same level as indicated at 43 as the level of the mercury in the reservoir. The elastic arms so function as to permit the mercury to readily flow into the coil 38 when the operating chamber is raised.

There is shown in Figure 3 a Bourdon tube 44, which is used when gas is the fluid passing through the line 2. In Figure 1, the means 30 is utilized for liquids.

Briefly stated, the means 30 for measuring the weight of liquid constitutes two elastic tube arms 45 and 46 which substantially parallel and terminate in vertical coils, as indicated at 47, with tube arm 45 communicating with the interior of a bulb or chamber 48, while tube arm 46 communicates with said chamber adjacent the bottom thereof. Pipe 29 directly communicates with tube 45 while pipe 26 is in communication with tube 46. It is evident that when liquid is flowing through pipe 2, said liquid will flow through pipe 29 into bulb 48 and back through pipe 26, due to pressure difference. When the Bourdon tube 44 is utilized, said tube either directly communicates with pipe 26 or with the static Pitot tube 22, the pipe 29 being unnecessary when the fluid is gas.

The integrating linkage indicated at 34 cooperates with either the Bourdon tube 44, or with the means 30 and with the means 31, for the purpose of directly integrating differential pressure and static pressure, or density, in some factor, to produce a single line record of the integrated value of the differential pressure and static pressure, or density, on a chart.

The meter case has a base or back wall 49, and secured thereto is a stud 50. This stud at its outer end carries a cross piece 51, which cross piece acts as a shaft frame for the integrating linkage. A shaft 52 is journaled at 53 to the cross piece and to the base at 54. A yoke 55 carries trunnions 56 and 57, respectively, journaled at 58 and 59 in the cross piece 51 and base 49. The shaft 52 carries yoke 60. One of the yoke arms is provided with a stud 61 in axial alignment with the shaft 52, and said stud has secured thereto pen-arm 62, carrying a pen 63 for play over the surface of chart 64. The yoke 60 bridges the cross piece 51, as illustrated in Figures 4 and 5.

The member 65 constitutes a screw provided with an elongated shank threaded into base 49, and carries a rotatable sleeve 66. Secured to the sleeve is lever 67 and included between an end of said lever and an end of arm 68 is link 69. The arm 68 is secured to the end of the Bourdon tube, as shown in Figure 3, and if the means 30 is used in place of the Bourdon tube, then link 69 is directly connected to the bulb 48. Fixedly secured to the sleeve 66 is a fork constituting a pair of parallel arms 70 and 71, both of which are curvedly bent at 72. Pivotally secured to the extremities of the curvedly bent ends of the arms are links 73 and 74.

Shaft 52 has lever 75 secured thereto. Interconnecting ends of the links 73 and 74, and the end of the lever 75, is link 76. The connection of the link 76 with the two links 73 and 74 is through the medium of a pin 77. Pivotally supported by the pin 77, and included between the parallel links, is a part 78 which spaces the two links.

Carried by the yoke 55 is a cam 79. The part 78 bears against the cam face.

Secured to the trunnion 57 is a lever 80. Link 81 carries at its ends adjustable slides 82 and 83, the slide 82 being carried on lever arm 80, and slide 83 on the tube 39.

In order to assure that the cam follower will at all times engage the cam face of the cam, there is provided the shaft 52, with an arm 84 carrying an adjustable weight 85. This weight normally revolves the shaft clockwise. For clarity of illustration, this weight and arm are shown in Figure 5 only.

The operation, uses and advantages of the invention are as follows:

If the density bulb or chamber 48 is used, liquid flows continuously through pipe 29 into the bulb or chamber and back through pipe 26 into the annular space 20 by differential pressure produced by liquid flow through the contracted throat. The straight portions of the tubes 45 and 46, together with the curved portions 47 shown for tube 46, and duplicated for tube 45, provide elastic arms adapted to yield under changes of weight of liquid which flows into and out of the bulb or chamber 48. Thus, any change in the unit weight rate or density of the liquid causes the bulb to rise or sink in direct proportion to such change. Hence, by connecting the link 69 with said bulb or chamber, said link is moved each time the bulb or chamber moves, to in turn rock the lever 67 connected to the sleeve 66 which, in turn, rocks the arms 70 and 71, to produce movement in the parallel links 73 and 74. The cam follower is carried between the links, which moves relative to the arcuate cam surface. The curvature of the cam surface is a circular arc struck from the pivot point 86 between the arm 75 and the link 76, with the result that if the cam is positioned at a given point, the cam follower may follow the cam surface without in any manner rocking arm 75. Thus, the rocking movement of arm 75 will depend primarily upon the position of the cam. As the cam is carried by yoke 55, movement of the yoke will change the position of the cam so as to render the cam surface eccentric to pivot point 86, and when this occurs, the arm 75 will be rocked. The yoke 55 is rocked by the lever arm 80, which is secured to the trunnion 57. The lever arm 80 is in linked connection with tube 39 at 83. The two tubes 39 and 41, and particularly the parallel portions thereof, provide a pair of resilient arms carrying the operating chamber 40. It will be observed that both of the arms constitute projections from the top of the respective coils (see Figure 4), and in such a position as to readily move under weight influence. Hence, any movement of the operating chamber will produce movement of arm 39 and movement in the connecting link 81 to rock lever arm 80 and rotate yoke 55 to change the position of the cam. The pen-arm 62 is directly connected through stud 61 and as arm 75 is also connected to shaft 52, movement of the pen-arm is controlled by the position of the cam follower on the cam surface, and the angular position of the cam is affected by differential pressure. The integrating linkage is so arranged that the arms 70 and 71 are actuated by change of density, to-wit, change of weight of liquid flowing into and out of the bulb 48, while the cam 79 is rocked to different positions by differential pressure.

In the case of the Bourdon tube 44, the tube is actuated by change in static pressure to move the link 69 and rock lever 67.

The arrangement is such that the pen-arm 62 will not move under three conditions, viz: (First) if there is no density or differential pressure in the several lines; (second) no density and a differential pressure change; and (third) density varies but there is no differential pressure. Hence, the action of two forces—differential pressure and density—are necessary, and both are interdependent with the integrating linkage so devised that, in the absence of either one of these forces, no record will be produced on the chart 64.

What is claimed is:

1. A mechanical movement for integrating two variables, including a first rotatable and a second shaft, a yoke secured to the first shaft, an arcuate cam carried by said yoke, an arm fixed to the second shaft, a cam follower for movement on the arcuate cam, a link between said arm and said cam follower, a third shaft, an arm fixed thereto, and a link between said last named arm and said cam follower, rotation of said third shaft to one position placing the cam follower on the axis of the first shaft, rotation of the first shaft positioning the cam whereby movement of the third shaft produces no rotation of the second shaft as the cam follower moves relative to the cam.

2. A mechanical movement for integrating two variables, including a cam adapted to be moved in accordance with one of said variables, a cam follower for movement over said cam, said cam follower being actuated in accordance with change of the other of said variables, a shaft, and means secured to said shaft and said cam follower for rocking said shaft, the degree of rocking of said shaft indicating the integrated value of the variables.

3. A mechanical movement for integrating two variables including a shaft to be turned by change of one of said variables, a second shaft to be turned by change in the other of said variables, an output member for said movement, a cam carried by the first said shaft, a cam follower for engagement with said cam, and link connections between the cam follower, the output member and the second said shaft, the relationship between said cam follower and cam being such that when the cam is in one position the cam follower may move thereover without producing any movement in the output member.

4. A mechanical movement for integrating two variables, including a cam, a cam follower for movement on the cam surface, an output member for said movement, said cam follower adapted to be moved by any change in one of said variables, and the said cam adapted to be rocked by change in the other of said variables, said output member being controlled as to movement by the position of the cam follower on the cam surface and the angular position of the cam as affected by said other of said variables, said cam follower having independent linkages relating it to the effects of the said one of said variables and to the output member.

5. A mechanical movement for integrating two variables, including an output member for said movement, a cam surface, a first shaft for moving said cam surface adapted to be rocked by change in one of said variables, a second shaft adapted to be rocked by change in the other of said variables, a lever arm secured to the output member, a lever secured to the first shaft, a cam follower for movement over the cam surface and a link connecting said output member and cam follower; and link connections between the cam follower and the lever arm secured to the output member and the second shaft; the said cam surface being a circular arc whose center is located at the connection between the output member and the link secured thereto and to the cam follower, whereby no rocking movement is produced in the output member when the cam follower moves relative to the cam surface and there is an absence of the said other of said variables.

6. A mechanical movement for integrating two variables, including a shaft to be rocked by one force; a second shaft to be rocked by a second force; a third shaft to be rocked to produce the combined effect of the two forces and without any rocking movement of the third shaft in the absence of either one of the forces; a cam secured to the second shaft, a cam follower in contact with the surface of said cam and moved by a rocking movement of the first shaft, and a connection between the cam follower and the third shaft, said third shaft being rocked in accordance with the position of the cam follower on the cam surface and the angular position of the cam.

7. A mechanical movement for integrating two variables, including a first shaft adapted to be moved by change of one force, a second shaft adapted to be moved by change in a second force, and a third shaft to be rocked when there are two forces acting on the first and second shafts to produce the combined effect of the forces; said first shaft provided with a fork, a link pivoted to an end of said fork, a lever arm secured to the third shaft and a link pivotally mounted to said lever arm and to the first link; a cam carried by the second shaft, the cam surface of which in one position of said cam is a circular arc struck from the pivotal connection between the lever arm secured to the third shaft and its link; a cam follower for movement over the cam surface, pivotally secured between the links at the common pivotal connection thereof and whereby said third shaft is moved in accordance with the position of the cam follower on the cam surface and the angular position of said cam.

SYDNEY WILLIAM BINCKLEY,
Executor of the Estate of George S. Binckley, Deceased.

REFERENCES CITED

The following references are of record in the file of this patent:

UNITED STATES PATENTS

| Number | Name | Date |
|---|---|---|
| 2,062,110 | Swartout | Nov. 24, 1936 |
| 2,052,764 | Harrison | Sept. 1, 1936 |
| 2,093,254 | Spitzglass | Sept. 14, 1937 |

FOREIGN PATENTS

| Number | Country | Date |
|---|---|---|
| 499,339 | French | Dec. 15, 1919 |